F. C. PERKINS.
ELECTRIC WATER HEATER.
APPLICATION FILED JULY 5, 1918.
1,403,102.
Patented Jan. 10, 1922.
2 SHEETS—SHEET 1.
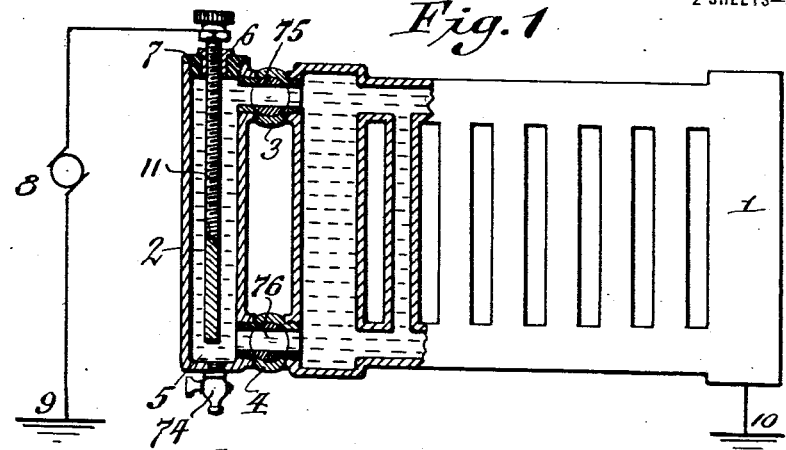
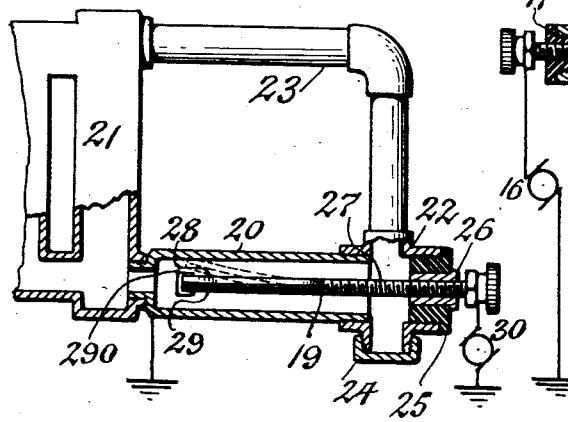
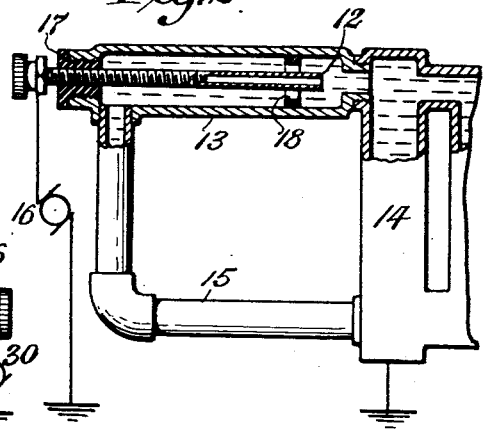
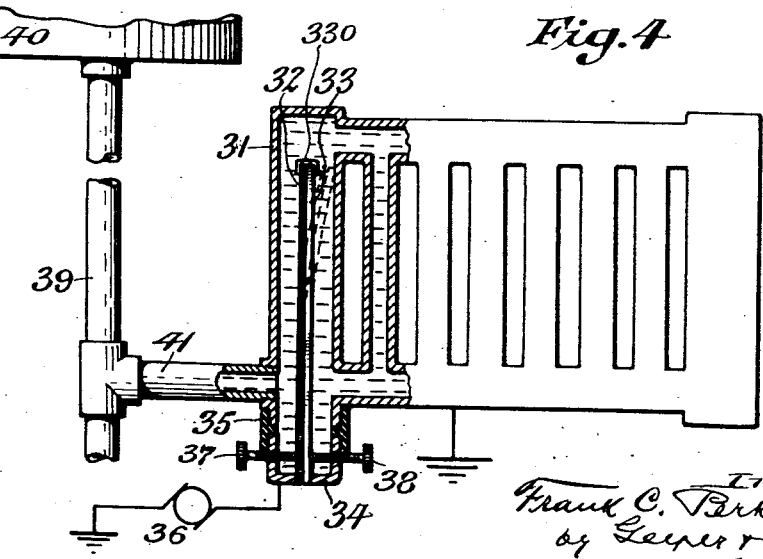
Inventor
Frank C. Perkins
by Leuper & Popp
Attorneys F. C. PERKINS.
ELECTRIC WATER HEATER.
APPLICATION FILED JULY 5, 1918.
1,403,102.
Patented Jan. 10, 1922.
2 SHEETS—SHEET 2.
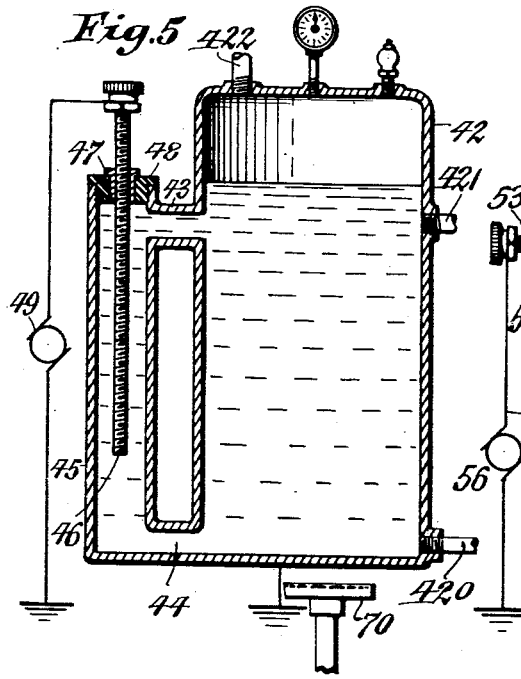
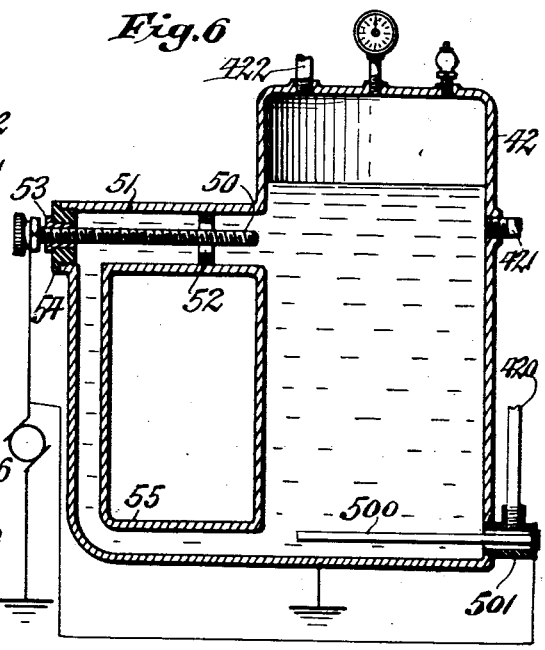
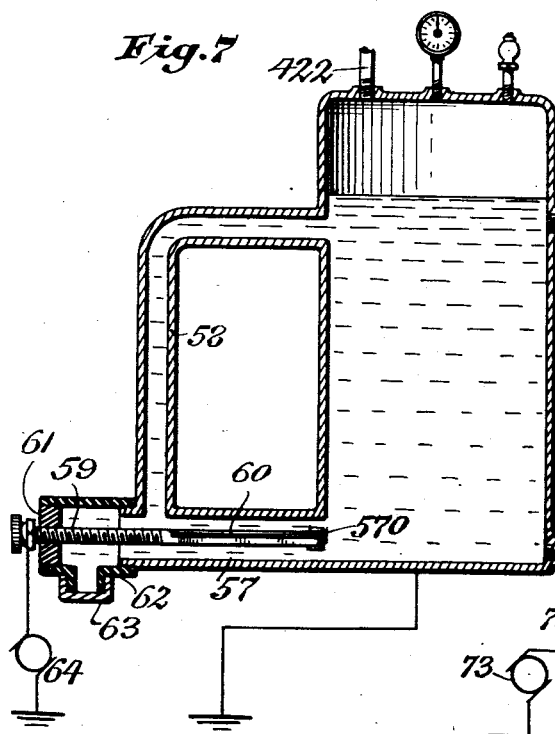
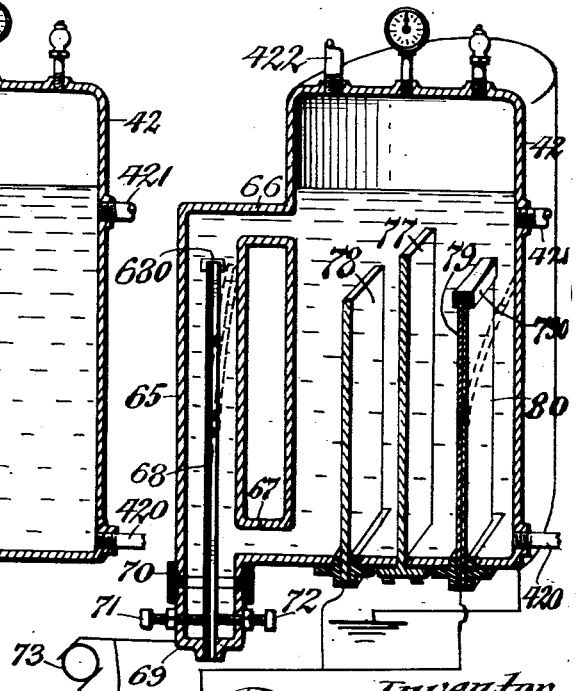
Inventor
Frank C. Perkins
by Geyer & Popp
Attorneys

UNITED STATES PATENT OFFICE.

FRANK C. PERKINS, OF BUFFALO, NEW YORK, ASSIGNOR OF ONE-EIGHTH TO GEORGE J. MEYER, ONE-EIGHTH TO GEORGE H. MEYER, ONE-EIGHTH TO LEO P. MEYER, AND ONE-EIGHTH TO EUGENE MEYER, ALL OF BUFFALO, NEW YORK.

ELECTRIC WATER HEATER.

1,403,102.  Specification of Letters Patent.  Patented Jan. 10, 1922.

Application filed July 5, 1918. Serial No. 243,318.

*To all whom it may concern:*

Be it known that I, FRANK C. PERKINS, a citizen of the United States, residing in Buffalo, in the county of Erie and State of New York, have invented new and useful Improvements in Electric Water Heaters, of which the following is a specification.

The object of this invention is to provide an improved electric water heater which may be used either as an independent unit by itself or in connection with a water heating or steam generating system which has its own heating means such as a coal, oil or natural gas burner and this invention has the object to provide an electric heater of this character which is simple in construction, efficient in operation and readily adjustable and which permits of utilizing to advantage the output of an electric generating plant when the demand otherwise is low.

In the accompanying drawings:

Figure 1 is a side elevation, partly in section, of a hot water radiator which is equipped with one form of my improved electrical heater. Figure 2 is a fragmentary sectional elevation of a radiator provided with another form of my invention. Figure 3 is a similar view showing still another form of my invention in which the electrode is adapted to thermostatically control the passage of the current. Figure 4 is a fragmentary sectional elevation of a hot water radiator showing the same connected with a hot water heating system so as to form an auxiliary heater relatively thereto. Figure 5 is a sectional elevation of a water heater or boiler equipped with one form of my improvements. Figures 6 and 7 are similar views of the same showing different applications of my invention to a boiler. Figure 8 is a similar view showing the electrode constructed to form part of a thermostatic regulator for controlling the amount of current which is utilized for heating the water.

Similar characters of reference refer to like parts throughout the several views.

Referring to Fig. 1, 1 represents a metal hot water radiator which is utilized for heating the surrounding space and which may be of any suitable or well known construction. This radiator may be used either in connection with an ordinary hot water heater such as are now in common use or may be operated independently thereof and the water therein heated solely by my improved electrical heating device.

2 represents a metal water heating chamber arranged in an upright position at one end of the radiator and connected at its upper and lower ends by horizontal metal nipples or pipes 3, 4, with the upper and lower parts of the radiator thereby permitting a circulation of the water through the water chamber and radiator when the water in the chamber is heated. 5 represents an upright electrode of metal arranged centrally within the water chamber and terminating at its lower end short of the bottom thereof while its upper part passes through a metal bushing 6 which is arranged in an insulating sleeve 7 secured to the upper end of the water chamber. 8 represents an electric source of any suitable character which in this instance is represented as a generator, one pole of which is connected with the upper end of the electrode while the other pole is grounded as shown at 9. The metal shell of the radiator is also grounded as shown at 10 so that when the generator is in operation an electric circuit is produced of which the water chamber and the electrode form terminals and and the body of water interposed between the same serves as a resistance conductor and is heated by the passage of the current therethrough. As the water in the chamber 2 is heated the same rises therein and passes through the upper nipple or passage 3 into the upper end of the radiator, thence downwardly to the bottom of the latter and then returns through a lower nipple or passage 4 into the lower end of the water chamber where the same is again heated. In this manner the water is repeatedly heated and a constant circulation maintained through the radiator for warming the adjacent space. The amount of water which is heated depends upon the area of the electrode which is exposed to the water in the chamber and in order to permit of regulating the heating effect of this electrode means are provided for adjusting the same so as to increase or decrease the operative area of the electrode. The means for this purpose shown in Fig. 1 consists in providing the opening in the bushing 6 with an internal screw thread which is engaged by an external screw thread 11 on the electrode.

This permits the electrode to be moved into or out of the water chamber to a greater or lesser extent by simply turning the electrode in the bushing. Upon moving the electrode farther into the water chamber its exposed area and heating effect is increased and by withdrawing the electrode from the water its heating capacity is reduced owing to the decreased area of its exposure to the water.

In the application of my invention shown in Fig. 1 the electrode 11 is made in the form of a solid rod, the pipes 3 and 4 are provided with valves 75, 76, respectively to permit the water heating chamber 2 to be cut off from the radiator 1 when making repairs or other purposes and the lower end of the chamber 2 is provided with a pet cock 74 for draining this chamber and the spaces connected therewith when desired.

Instead of making the electrode solid and mounting the same vertically on the upper end of the water heating chamber the electrode 12 may be made hollow and mounted horizontally in a horizontal metal water heating chamber 13 which is connected at one end with the upper part of the metal radiator 14 while the other end of this last mentioned chamber may be connected by a pipe 15 with the lower part of the radiator, as shown in Fig. 2. In this case the generator 16 is connected on one side with the outer end of the electrode and ground on its other side and the radiator is grounded in substantially the same way as shown in Fig. 1. Instead of supporting the electrode by means of a metal bushing which is insulated by a sleeve from the water heating chamber this may be accomplished by passing the electrode directly through an insulating sleeve or bushing 17 and providing the opening in this bushing with an internal screw thread which engages with an external screw thread on the electrode so that upon turning the latter the screw connection between the electrode and the bushing will cause the electrode to be moved lengthwise in the water chamber and expose more or less of its length to the water in this chamber. In order to avoid accidental contact of the inner part of this electrode with the adjacent metal parts of the water heating chamber the latter is provided with an insulating ring 18 which is secured within the chamber 13 around the inner part of the electrode, as shown in Fig. 2, thereby positively preventing metallic contact at all times between the free end of electrode 12 and the metal chamber 13. The heating effect on the water by the passage of the electric circuit through the same between the electrode 12 and the chamber 13 is like that produced in the construction shown in Fig. 1.

If desired the electrode 19 may be mounted horizontally in a horizontal metal water heating chamber 20 which is arranged in line with the lower part of the radiator 21, as shown in Fig. 3. In this last mentioned construction the water heating chamber comprises a tubular metal body which is connected at its inner end with the lower part of the radiator. The outer end of this water chamber is connected with the upper part of the radiator by a metal coupling 22 which is constructed in the form of a cross the inner branch of which is screwed on to the outer end of the body, its upper branch being connected with the top of the radiator by means of a tube 23, its lower branch being closed by a cap 24 and its outer branch containing an insulating sleeve 25 which carries a metal bushing 26. The electrode in this instance comprises an outer section 27 having the form of an externally screw threaded rod which engages with an internal screw threaded opening of the bushing 26 and the inner section having the form of two plates 28, 29 constructed of metals having different rates of expansibility and contractibility when subjected to changes in temperature, thereby forming a thermostat. These plates are secured to each other side by side lengthwise and have their other corresponding ends connected with the inner end of the threaded rod while their opposite free ends are adapted to move toward and from the adjacent part of the metallic part of the chamber in response to variations in the temperature of the water in the same. The outer end of this electrode is connected with one pole of a generator 30 the opposite pole of which is grounded and the heating chamber and the part in metallic contact therewith being also grounded. As the current from the generator 30 passes through the water interposed between this electrode and the adjacent metal water chamber, this water between the same is heated by reason of the resistance it offers to the passage of this current and thereby produces a circulation through this heating chamber and radiator. By screwing the rod 27 of this electrode into or out of the bushing 26 more or less of this electrode is exposed to the water within this chamber and thereby regulates the heating effect of this device. As the temperature of the water lowers below the desired amount the thermostatic plates 28, 29 are bent laterally toward the metal wall of the chamber and thereby cut out the resistance of the water increasing the current therein so that additional heating of this water occurs for the time being. When this water has been heated again sufficiently to cause the thermostatic plates to retract from the metal wall of this chamber then the passage of the current through the water becomes normal and the heating of the water continues as before at the desired temperature, say two hundred degrees Fahrenheit, if that is the desired constant temperature.

In the construction shown in Fig. 4 one of the metal end columns of the radiator is utilized as a water heating chamber 31. In this instance the electrode comprises two upright thermostatic plates 32, 33 which are connected with each other side by side and arranged within the water chamber 31, the lower end of this electrode being mounted on a metal cap 34, which is in turn connected by means of an insulating tube 35 with the lower end of the chamber 31. In this case the generator 36 has one pole connected with the metal cap 34 and its other pole is grounded while the body of the radiator is grounded, thereby causing the water between the electrode and the wall of the chamber 31 to be heated and flow from the upper end thereof into the radiator and from the lower end of the latter back to the lower end of the chamber 31. When the water falls below a predetermined temperature the free end of this electrode is deflected not sufficiently to engage with the metal wall of this heating chamber but sufficiently to cut out gradually the resistance of the water so that the heating electrically is increased and when the temperature of this water rises sufficiently the free end of the electrode moves away from this wall so that the water again forms a greater part of the passage or conductor of the current and holds the temperature constant. In order to permit of adjusting this electrode relatively to the wall of the heating chamber 31 and thereby determine the degree at which the water shall be heated by the current, means are provided which preferably consist of two screws 37, 38 arranged in threaded openings in the cap 34 and engaging with opposite sides of this electrode. Upon tightening one of these screws and loosening the other the free end of this electrode will be carried away from the metal wall of the respective water heating chamber, and vice versa, thereby enabling the heating effect of the electrode upon the water to be adjusted as required.

In Fig. 4 is also shown an instance in which the radiator instead of being used as a self contained heater is coupled with another or main water heater so as to serve as an auxiliary heater thereto for which purpose an upright pipe 39 is provided which has its lower end connected in any suitable manner with a hot water boiler of usual construction while its upper end is connected with a water supply or expansion tank 40 and its intermediate part is connected by a branch pipe 41 with the lower part of the heating chamber 31 of this radiator. In this last mentioned organization the water for the radiator may be ordinarily heated by the boiler which is connected with the pipe 39 without the aid of the electric current which is supplied by the electric generator or the water in the radiator may be heated by the generator 36 independently of the boiler which is connected with the pipe 39, or this water may be heated by utilizing both this boiler and electric generator.

In the organization shown in Figs. 5–8, my invention is combined directly with a hot water or steam boiler 42 which is usually provided with a shell or wall of metal and is heated by a coal, gas or oil burner of any suitable construction, and provided with a water inlet pipe 420, an upper water outlet pipe 421 and an upper steam outlet pipe 422. In the construction shown in Fig. 5 this boiler is heated by a main gas burner 70 arranged below the shell thereof and the upper and lower ends of the latter are connected by upper and lower horizontal metal pipes or passages 43, 44 with the upper and lower ends of an upright metal water chamber 45. Within this water chamber is arranged an upright electrode 46 having its upper part arranged in a metallic bushing 47 which is supported by means of an insulating sleeve 48 on the upper end of this chamber. The boiler 42 and one side of the electric generator 49 are grounded and the other side of the generator is connected with the outer end of the electrode so as to cause a current of electricity to flow through the water between this electrode and chamber, whereby this water is heated and caused to circulate through this water chamber and boiler. Adjustment of the electrode for varying the exposure of the same to the water is effected by providing its exterior with an external screw thread which engages with an internal thread in the companion bushing so that upon turning this electrode its inner part will move into or out of this chamber.

In Fig. 6 an upper externally screw threaded electrode 50 is employed which has its inner part arranged in a horizontal metal water chamber 51 but prevented from effecting metallic contact therewith by an insulating ring 52 while its outer part engages with an internally screw threaded metallic bushing 53 which is supported by means of an insulating sleeve 54 on the outer end of this chamber. The inner end of this chamber communicates with the upper part of the hot water boiler, while its outer end is connected with the lower end thereof by means of a pipe 55. A lower electrode 500 is also mounted horizontally in the lower part of the boiler 42 and supported thereon by means of an insulating member 501 which is preferably constructed in the form of a T pipe fitting which connects the water inlet pipe 420 with the boiler. This boiler 42 is grounded and one side of the generator 56 is also grounded while its opposite side is connected with the electrodes 50 and 500.

In the construction shown in Fig. 7 the metal water chamber 57 is arranged horizontally and connected at its inner end with the lower end of the boiler but its outer end is connected with the upper end of the boiler by means of a pipe 58 and an electrode is employed which comprises an outer external screw thread section or rod 59 and an inner section composed of two thermostatic plates 60 of different metal adapted to move into and out of engagement with the adjacent metallic wall of this chamber. The outer section 59 of this electrode engages with an internal screw threaded opening in an insulating bushing 61 so as to permit this electrode to be moved into or out of the water chamber for varying the heating effect of the electrode. This bushing is connected with the outer branch of a T-shaped pipe coupling 62, of insulating material, the inner branch of which is connected with the outer end of this water chamber and the lower branch of which is normally closed by means of a cap 63. In this instance the electric connections are similar to those in the previous figures, the generator 64 being connected at one side with the electrode and on the other side with the ground while the boiler which is in electrical connection with this chamber is also grounded.

The construction shown in Fig. 8 comprises an upright heating chamber 65 of metal connected by upper and lower metal pipes 66, 67 with the metal shell of the boiler, an electrode arranged within this water chamber and composed of two thermostat plates 68 of metal the inner ends of which are adapted to move into and out of contact with the metal wall of this chamber, a cap 69 carrying this electrode at its outer end and connected by an insulating tube 70 with the lower end of this chamber, two adjusting screws 71, 72, arranged on this cap and engaging with opposite sides of this electrode, and an electric generator 73 having one pole connected with this cap and its other pole grounded and the metal shell of the boiler being also grounded. Projecting upwardly from the central part of the boiler 42 in Fig. 8 is a baffle plate or partition 77 and between one side of this baffle and the boiler wall is arranged a stationary plate electrode 78 and between the opposite side of the same and the boiler wall is arranged a thermostatic electrode composed of two thermostat plates 79, 80 these last mentioned electrodes being connected to the same side of the generator 73 as the electrode 68. The electrode 79, 80 is always out of contact with the boiler wall so the electric current passes through the water between the same and heats it but when the water has fallen below a predetermined temperature the electrode 79, 80 bends toward the boiler wall and lowers the water resistance, the current increasing so that more intense heating of the water is allowed until the desired temperature is attained. By separating the two electrodes within the boiler by means of a baffle plate 77 each of these electrodes will heat the water adjacent to the same independently of the other and thereby obtain the maximum efficiency of the same.

In order to prevent the thermostatic electrodes from coming in actual contact with the metal walls of the respective chambers in which the same are arranged the outer or movable free ends of the same may be provided with guards of insulating material which prevent short circuiting of the current, such a guard being shown at 290 in Fig. 3, at 330 in Fig. 4, at 570 in Fig. 7 and at 680 and 790 in Fig. 8.

By means of this invention greater flexibility in the heating apparatus is obtainable and a choice of different heating means is possible which can be utilized in various ways to suit different conditions and circumstances. For instance, when the current consumption from the main electric generator plant is at low load then such current may be utilized for heating the water for a radiator or boiler as a heat storage system in addition to the usual heating means. When however, the maximum output of the generating station or plant is in demand the current to the radiator may be cut off and the heating of the water in the same effected solely by means of the ordinary heating system of hot water boiler. In case of emergency, as for instance when the hot water boiler breaks down or becomes inoperative for any reason, the heating of the water in the radiator or boiler may be effected solely by the current derived from the generating plant. Obviously therefore this heating system permits of utilizing the electric current when the same is not required for other purposes and can therefore be obtained at a very low rate. It also permits of heating water and storing this heat while the electric current is available at low cost on the valley of the load and then utilizing this water stored heat thereafter for different purposes during a time when the cost of electricity is greater on the peak of the load and in greater demand elsewhere.

By this means it is also possible to utilize to greater advantages the large hydro-electric or other electric generating plants than has been possible heretofore and thereby permits reduction in the cost of furnishing electricity and increasing the income by providing a flat load line without increasing the investment at the generating plant.

I claim as my invention:

1. An electric water heater comprising a water chamber forming an electrode, another electrode mounted on said metal wall but insulated therefrom and constructed in the form of a thermostat so that the same will move toward and from said wall in response to variations in the temperature of the water, and an electric source having its poles connected with said electrode and metal wall, respectively.

2. An electric water heater comprising a water chamber having a metal wall, an insulating support mounted on said wall and having an internally screw threaded opening, an electrode having an outer section having the form of an externally screw threaded rod which engages with said opening and an inner section comprising two plates of metals having different rates of expansion and contraction and which are secured together side by side and connected at one end with the inner end of said rod while the other ends of said plates are adapted to move toward and from the adjacent part of said wall in response to variations in the temperature of said water, and an electric source having its poles connected with said electrode and wall, respectively.

FRANK C. PERKINS.